United States Patent
Yamaoka et al.

(12) 
(10) Patent No.: US 10,878,304 B2
(45) Date of Patent: Dec. 29, 2020

(54) STICKER WITH IC TAG

(71) Applicant: TOPPAN PRINTING CO., LTD., Tokyo (JP)

(72) Inventors: Keinosuke Yamaoka, Tokyo (JP); Takamitsu Nakabayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/913,490

(22) Filed: Mar. 6, 2018

(65) Prior Publication Data

US 2018/0197060 A1 Jul. 12, 2018

Related U.S. Application Data (63) Continuation of application No. PCT/CN2016/098406, filed on Sep. 8, 2016.

(30) Foreign Application Priority Data

Sep. 8, 2015 (CN) .......................... 2015 1 0566660

(51) Int. Cl.
*G08B 13/14* (2006.01)
*G06K 19/077* (2006.01)
(Continued)

(52) U.S. Cl.
CPC ....... *G06K 19/0776* (2013.01); *G06K 19/073* (2013.01); *G06K 19/077* (2013.01);
(Continued)

(58) Field of Classification Search
CPC ............. G06K 19/0776; G06K 19/073; G06K 19/07726; G06K 19/0716; G06K 19/077; G06K 19/07798; B05D 51/18
(Continued)

(56) References Cited

U.S. PATENT DOCUMENTS 5,126,749 A * 6/1992 Kaltner .............. G08B 13/2474
340/572.7
6,703,935 B1 * 3/2004 Chung .................... H04L 63/12
340/572.7
(Continued)

FOREIGN PATENT DOCUMENTS

CN 101001792 A 7/2007
CN 101128841 A 2/2008
(Continued)

OTHER PUBLICATIONS

International Searching Authority, "International Search Report," issued in connection with International Patent Application No. PCT/CN2016/098406, dated Nov. 28, 2016.
(Continued)

*Primary Examiner* — Zhen Y Wu
(74) *Attorney, Agent, or Firm* — Foley & Lardner LLP (57) ABSTRACT

A sticker with IC tag comprises: an antenna portion; and an IC chip coupled to the antenna portion and having a function of communicating through the antenna portion. The sticker with IC tag is installed on a covered container. The sticker with IC tag comprises a single-stroke line portion, which is coupled to the IC chip and adhered to an upper surface of a cover portion of the covered container. The IC chip detects disconnection of the single-stroke line portion.

17 Claims, 5 Drawing Sheets

(51) Int. Cl.
  *G06K 19/073* (2006.01)
  *G06K 19/07* (2006.01)
  *B65D 51/18* (2006.01)

(52) U.S. Cl.
  CPC ... *G06K 19/0716* (2013.01); *G06K 19/07726* (2013.01); *G06K 19/07798* (2013.01); *B65D 51/18* (2013.01)

(58) Field of Classification Search
  USPC .................................................. 340/572.1
  See application file for complete search history.

(56) References Cited

U.S. PATENT DOCUMENTS

| | | | | |
|---|---|---|---|---|
| 7,782,212 | B2* | 8/2010 | Burns | B65D 51/20 340/572.8 |
| 8,368,539 | B2* | 2/2013 | Adstedt | G06K 19/07798 340/572.1 |
| 9,016,588 | B2* | 4/2015 | Kaga | G06K 19/07758 235/492 |
| 9,471,817 | B1* | 10/2016 | Alhazme | G06K 19/07345 |
| 9,495,851 | B1* | 11/2016 | Russell | G06K 19/07798 |
| 9,715,606 | B2 | 7/2017 | Russell et al. | |
| 2005/0012616 | A1* | 1/2005 | Forster | G06K 19/073 340/572.7 |
| 2005/0179552 | A1* | 8/2005 | Shoji | G06K 19/07779 340/572.7 |
| 2005/0217019 | A1* | 10/2005 | Johnson | A61H 35/02 4/620 |
| 2005/0242957 | A1 | 11/2005 | Lindsay et al. | |
| 2006/0145870 | A1* | 7/2006 | Coveley | G06K 19/07749 340/572.8 |
| 2006/0152364 | A1* | 7/2006 | Walton | G06K 19/07345 340/568.1 |
| 2006/0214789 | A1* | 9/2006 | Posamentier | G06K 19/07798 340/545.6 |
| 2007/0018832 | A1* | 1/2007 | Beigel | G06K 19/0739 340/572.7 |
| 2007/0069895 | A1* | 3/2007 | Koh | G06K 19/02 340/572.1 |
| 2007/0096906 | A1* | 5/2007 | Lyons | G06K 19/07749 340/572.1 |
| 2007/0182564 | A1* | 8/2007 | Abbott | B65D 41/045 340/572.8 |
| 2007/0200706 | A1* | 8/2007 | Lee | H01Q 19/0407 340/572.7 |
| 2007/0210173 | A1* | 9/2007 | Nagel | G06K 7/0008 235/492 |
| 2007/0262866 | A1* | 11/2007 | Eveland | G06K 19/07749 340/572.7 |
| 2007/0273532 | A1* | 11/2007 | Martin | G06K 19/04 340/572.7 |
| 2008/0061153 | A1* | 3/2008 | Hickle | G06Q 20/203 235/492 |
| 2008/0218348 | A1* | 9/2008 | August | G06Q 20/203 340/572.1 |
| 2009/0102664 | A1* | 4/2009 | Puccini | G08B 13/2434 340/572.7 |
| 2010/0217707 | A1* | 8/2010 | Phillips | G06Q 20/3278 705/41 |
| 2010/0308965 | A1* | 12/2010 | Weitzhandler | B67D 7/348 340/10.1 |
| 2011/0253715 | A1* | 10/2011 | Phaneuf | B65D 53/04 220/212 |
| 2011/0285507 | A1 | 11/2011 | Nelson | |
| 2011/0303751 | A1* | 12/2011 | Lai | H01Q 1/273 235/492 |
| 2012/0074230 | A1* | 3/2012 | Bernhard | H01Q 1/36 235/492 |
| 2012/0211551 | A1* | 8/2012 | Friebe | B65D 75/30 229/87.01 |
| 2012/0217244 | A1* | 8/2012 | Phaneuf | B65D 53/04 220/212 |
| 2013/0044007 | A1* | 2/2013 | Paavilainen | G09F 3/0292 340/945 |
| 2014/0002225 | A1* | 1/2014 | Konanur | H04B 5/0081 336/200 |
| 2015/0186770 | A1* | 7/2015 | Arai | B65D 41/3423 235/492 |
| 2015/0266634 | A1 | 9/2015 | Yang | |
| 2015/0278671 | A1* | 10/2015 | Martin | G06K 19/027 235/492 |
| 2015/0353234 | A1* | 12/2015 | Yagishita | B65D 25/02 206/216 |
| 2016/0023812 | A1 | 1/2016 | Kikel | |
| 2016/0159535 | A1* | 6/2016 | Diaz | B65D 41/02 705/28 |
| 2016/0347513 | A1 | 12/2016 | Coelho | |
| 2017/0107120 | A1 | 4/2017 | Sajid et al. | |
| 2017/0183135 | A1 | 6/2017 | Pic et al. | |
| 2017/0195120 | A1* | 7/2017 | Enguent | B65D 55/06 |
| 2017/0203895 | A1 | 7/2017 | Pic et al. | |
| 2018/0197060 | A1* | 7/2018 | Yamaoka | G06K 19/073 |

FOREIGN PATENT DOCUMENTS

| | | |
|---|---|---|
| CN | 202529311 U | 11/2012 |
| CN | 203673507 U | 6/2014 |
| CN | 104411597 A | 3/2015 |
| DE | 1294251 B | 4/1969 |
| DE | 10012204 A1 | 9/2001 |
| FR | 2 848 990 A1 | 6/2004 |
| FR | 3021439 A1 | 11/2015 |
| JP | 2001-202489 A | 7/2001 |
| JP | 3105286 U | 10/2004 |
| JP | 2005-258351 A | 9/2005 |
| JP | 2006-123917 A | 5/2006 |
| JP | 2006-184082 A | 7/2006 |
| JP | 2007102348 A * | 4/2007 |
| JP | 2008-143589 A | 6/2008 |
| JP | 2013-084039 A | 5/2013 |
| JP | 2014-005032 A | 1/2014 |
| JP | 2014-012560 A | 1/2014 |
| JP | 2014-114070 A | 6/2014 |
| WO | WO-2004/032044 A1 | 4/2004 |
| WO | WO-2006/016559 A1 | 2/2006 |
| WO | WO-2015/177448 A1 | 11/2015 |

OTHER PUBLICATIONS

International Searching Authority, "International Search Report," issued in connection with International Patent Application No. PCT/CN2016/098404, dated Dec. 7, 2016.

International Searching Authority, "Written Opinion," issued in connection with International Patent Application No. PCT/CN2016/098404, dated Dec. 7, 2016.

Extended European Search Report dated Feb. 25, 2019 in corresponding application No. 16843662.4.

Extended European Search Report dated Mar. 29, 2019 in corresponding application No. 16843663.2.

International Searching Authority, "International Search Report," issued in connection with International Patent Application No. PCT/JP2017/044744, dated Mar. 20, 2018.

International Searching Authority, "Written Opinion," issued in connection with International Patent Application No. PCT/JP2017/044744, dated Mar. 20, 2018.

European Patent Office, "Communication with extended European Search Report," issued in connection with European Patent Application No. 17880921.6, dated Nov. 22, 2019.

* cited by examiner

STICKER WITH IC TAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/CN2016/098406, filed on Sep. 8, 2016, which is based upon and claims the benefit of priority of CN 201510566660.0, filed Sep. 8, 2015, the entireties of which are hereby incorporated by reference.

FIELD

The present disclosure relates to a sticker with an IC tag, and more specifically to a sticker with an IC tag that can prevent the replacement of contents in containers, such as contents in bottles covered with soft cork and the like, with counterfeit contents.

BACKGROUND

In the past, the global demand for goods management, logistics management, and authenticity determination of goods such as wines is increasing. As an IC tag used for goods management, logistics management, and true and false management, an RFID tag is known for communicating with a reader in a contactless manner so as to transfer information between the reader and the tag itself. An RFID tag is composed of an RFIC chip for processing wireless signals, and an antenna for transmitting and receiving the wireless signals. Specified information is transmitted and received between the antenna of the RFID tag and the antenna of the reader as high frequency signals through a magnetic field or an electric wave.

However, in order to prevent the unlawful opening of the wine bottle or to prevent the repeated use of the IC tag, the IC tag should be destroyed when the wine bottle is opened.

As a technique used to destroy the IC tag when opening the wine bottle as described above, for example, Patent Document 1 discloses the following IC tag sticker and the adhering method thereof: the antenna is installed as stretching across both a metal cover and a container body, the antenna is destroyed when the cover is opened, so the opening of the metal cover is detected through the condition of the antenna being destroyed. In order to easily destroy the antenna when opening the cover, the IC tag sticker in Patent Document 1 adopts the following structure: namely, a brittle processing for cutting off a slit (or loop circuit) for impedance matching adjustment of the antenna is carried out.

Existing technical document: Patent Document 1: WO2006/016559

SUMMARY OF THE INVENTION

Technical Problem to be Solved by the Invention

However, there is a situation, for example, where a cover of a covered container such as a wine bottle is made of a flexible material like cork or soft plastic. In addition, for a vintage wine, there is a tool for taking out the wine contents without pulling out the cork, and there have been many instances where a tool has been used to fraudulently replace genuine wine with counterfeit.

However, as recited in for example Patent Document 1, even if the sticker with IC tag is installed on a side of a wine bottle so that the antenna stretches across both a cover portion and a container body, the antenna may not be destroyed when a tool such as needle is inserted from an upper surface of the cover. Therefore, malicious use of the above tool to replace genuine wine with counterfeit cannot be detected.

The present invention is implemented in view of the above-mentioned problem, and its purpose is to provide a sticker with IC tag which can detect conditions where a thinner tool, like a needle, is inserted from an upper surface of a cover of a covered container so as to prevent replacement of the contents.

Technical Measures for Solving the Technical Problem

To solve the above-mentioned technical problem, a sticker with IC tag involved in the present disclosure comprises: an antenna portion; and an IC chip bonded with the antenna portion and having a function of communicating through the antenna portion. The sticker with IC tag is installed on a covered container, characterized in that the sticker with IC tag comprises a single-stroke line portion which is coupled to the IC chip and adhered on the upper surface of the cover of the covered container. The IC chip detects disconnection of the single-stroke line portion.

Effect of Invention

According to the present disclosure, under the condition that a covered container has a cover such as a cork or plastic, a single-stroke line portion would be cut off when attempting to draw out contents by inserting a tool such as a needle from an upper surface of the cover, and disconnection may be detected by use of the IC chip so as to reliably prevent fraudulent or malicious replacement of the contents.

DETAILED DESCRIPTION OF REPRESENTATIVE EMBODIMENTS

The present invention will be described by description of the following representative embodiments. It will be understood that the following embodiments are intended to be representative of the present invention and that the present invention is not necessarily limited to these representative embodiments.

In the following descriptions, the first embodiment of the present disclosure will be explained with reference to FIGS. 1 to 3.

First Embodiment

Figure 1:
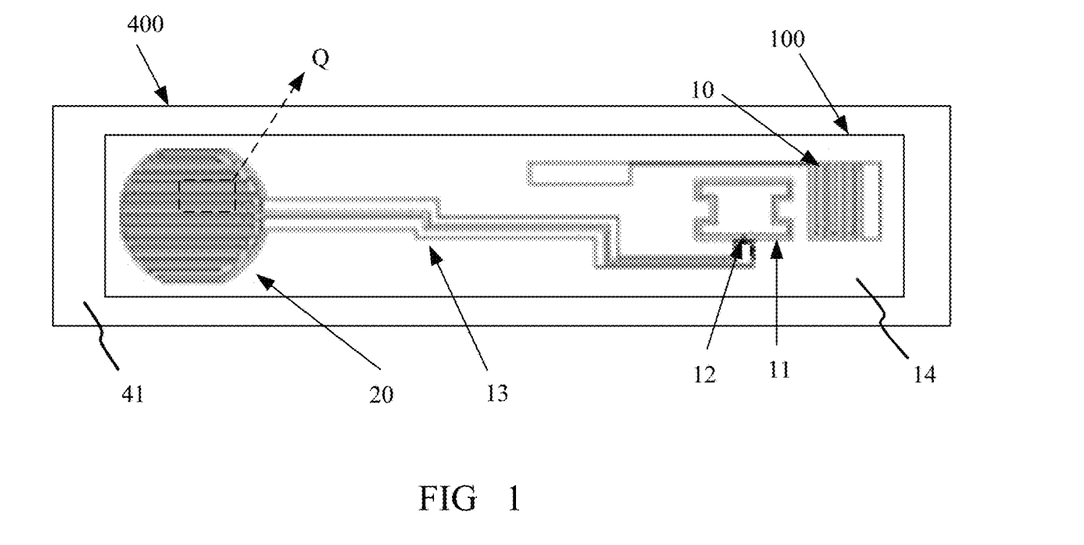
FIG. 1 is a top view showing the structure of a sticker with an IC tag in UHF band involved in the first embodiment of the present disclosure.

FIG. 1 is a top view showing the structure of a sticker with IC tag 400 in UHF band involved in the first embodiment of the present disclosure. As shown in FIG. 1, the sticker with IC tag 400 in UHF band comprises an IC tag insert 100, and a sheet-shaped tag paper 41 being a support for the sticker with IC tag 400. The IC tag insert 100 comprises: a radiation element 10 being an antenna; a slit (or loop circuit) for impedance matching adjustment, which adjusts the impedance matching of the antenna characteristics; an IC chip 12, an end of which is coupled to the slit (or loop circuit) for impedance matching adjustment; disconnection detection circuit 13, which is coupled to the other end of the IC chip 12 and is constituted of a ring conductor; and a substrate 14, which is sheet-shaped and becomes a support for the radiation element 10, the slit (or loop circuit) for impedance matching adjustment 11, and the disconnection detection circuit 13. In addition, the radiation element 10 and the slit (or loop circuit) for impedance matching adjustment 11 form the antenna portion, which is used for communicating with an antenna of a reader (not illustrated).

In addition, the disconnection detection circuit 13 comprises a single-stroke line portion 20 constituted of a single-stroke line shaped conductor. As an example of the circuit pattern of the single-stroke line portion 20, a circuit pattern formed by winding lines can be enumerated. For example, as shown in FIG. 1, a single-stroke line portion 20 is formed by using a circuit pattern formed by bending one line into a zigzag shape.

The IC chip 12 has a function of detecting on and off of the disconnection detection circuit 13 including the single-stroke line portion 20, especially, detecting disconnection of the single-stroke line portion 20. In addition, in the sticker with IC tag 400 in UHF band of the present embodiment, the IC chip 12 utilizes UCODE G2iL+ produced by NXP Semiconductors Corporation, but it is not limited to this. An IC chip such as UCODE G2iM+ produced by NXP Semiconductors Corporation that detects disconnection using resistance of the disconnection detection circuit other than antenna terminals may also be utilized, for example.

Figure 2:
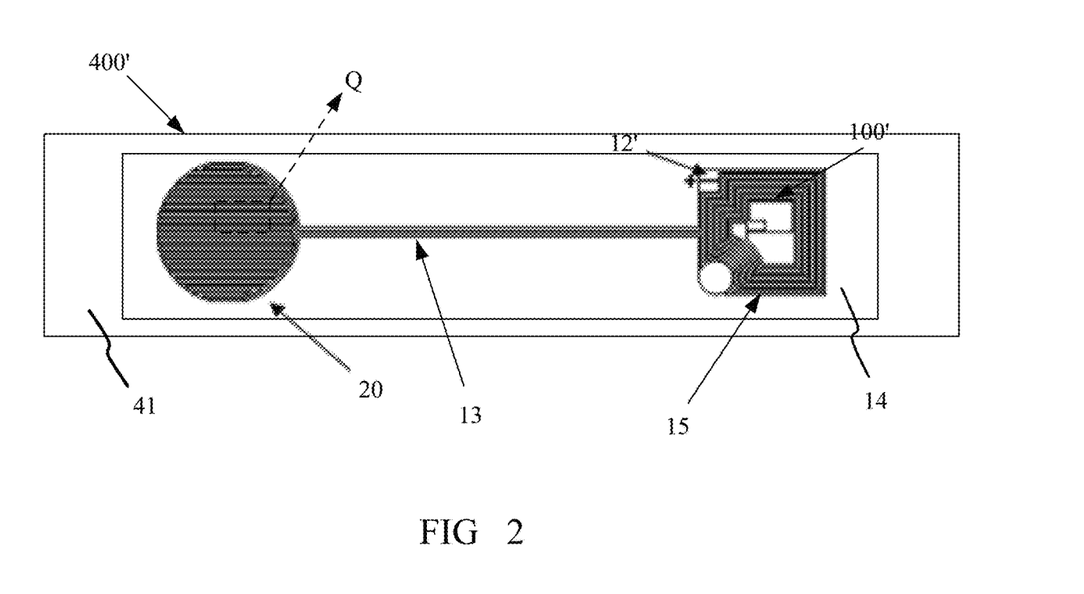
FIG. 2 is a top view showing the structure of a sticker with an IC tag in HF band involved in the first embodiment of the present disclosure.

FIG. 2 is a top view showing the structure of a sticker with IC tag 400' in HF band used in the present embodiment of the present disclosure. As shown in FIG. 2, the sticker with IC tag 400' in HF band comprises an IC tag insert 100', and a sheet-shaped tag paper 41 being a support for the sticker with IC tag 400'. The IC tag insert 100' comprises: a loop circuit for antenna 15; an IC chip 12, an end of which is coupled to the loop circuit for antenna 15; disconnection detection circuit 13, which is coupled to the other end of the IC chip 12 and is constituted of a ring conductor; and a substrate 14, which is sheet-shaped and becomes a support for the loop circuit for antenna 15 and the disconnection detection circuit 13. In addition, the loop circuit for antenna 15 forms the antenna portion, which is used for communicating with an antenna of a reader (not illustrated).

In addition, the disconnection detection circuit 13 comprises a single-stroke line portion 20 formed by a winding shaped conductor. The structure of the single-stroke line portion 20 is identical to that shown in FIG. 1.

The IC chip 12' has the function of detecting on and off of the disconnection detection circuit 13 including the single-stroke line portion 20. In addition, in the sticker with IC tag 400' in HF band in the present embodiment, the IC chip 12' utilizes ICODE SLIX produced by NXP Semiconductors Corporation, but it is not limited to this.

In addition, while FIG. 2 discloses a sticker with IC tag 400' in HF band that includes the disconnection detection circuit 13, wherein the single-stroke line portion 20 is a part of the disconnection detection circuit 13, there can be situations where no disconnection detection circuit 13 is included but a part of the loop circuit for antenna 15 is used to form the single-stroke line portion. In other words, the single-stroke line portion can also be a part of the antenna. In this case, as an IC chip, not only a chip having terminals for antenna and terminals for detecting on and off of circuits may be used, but also a chip having only one pair of antenna terminals may be used. The IC chip detects disconnection of the single-stroke line portion based on whether or not it can communicate through the antenna portion.

Next, the adhering method of the sticker with IC tag of the present embodiment is illustrated.

Figure 3:
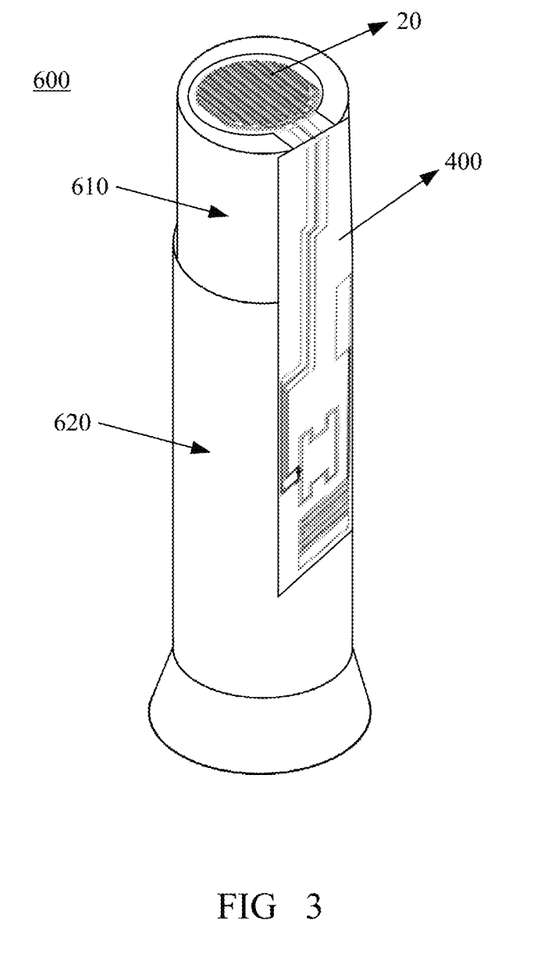
FIG. 3 is a perspective view illustrating the pasting method of a sticker with an IC tag involved in the first embodiment of the present disclosure.

FIG. 3 is a perspective view illustrating the adhering method of a sticker with IC tag 400 involved in the present embodiment of the present disclosure. As shown in FIG. 3, the covered container 600 is a bottle such as a wine bottle that includes a cork as a cover 610 and a container body 620. The sticker with IC tag 400 is adhered to the covered container 600 so that the single-stroke line portion 20 is adhered on the upper surface of the cover 610.

In addition, FIG. 3 discloses a situation where the single-stroke line portion 20 is adhered by covering a portion of the upper surface of the cover that corresponds to an inner side of the opening of the container, but it is not limited to this. For example, the adhering can be performed by covering the whole upper surface of the cover. Or, when the IC tag insert is obscured by opaque tag paper, since the exact position of the single-stroke line portion is unknown, it is difficult to insert a needle without contacting the single-stroke line portion. Therefore, the single-stroke line portion can also be adhered to cover only a part of the upper surface of the cover.

According to the structure of the present embodiment, for example, inserting a tool such as a needle into an upper surface of cover such as the cork will make disconnection of the single-stroke line portion 20 happen. The IC chip 12 can detect disconnection of the single-stroke line portion 20 and detect malicious needle traces so as to reliably prevent the occurrence of inserting a needle into the cork for illegal replacement of the contents.

In addition, while in the present embodiment, a bottle having a cork such as a wine bottle is illustrated as an example of the covered container, the use of the sticker with IC tag of the present disclosure is not limited to this. The sticker with IC tag of the present disclosure may also be applied for example to a container having a thinner aluminum cover, a container having a upper surface into which a needle may be easily inserted, etc.

In the following description, a second embodiment of the present disclosure will be explained with reference to FIG. 4.

Second Embodiment

Figure 4:
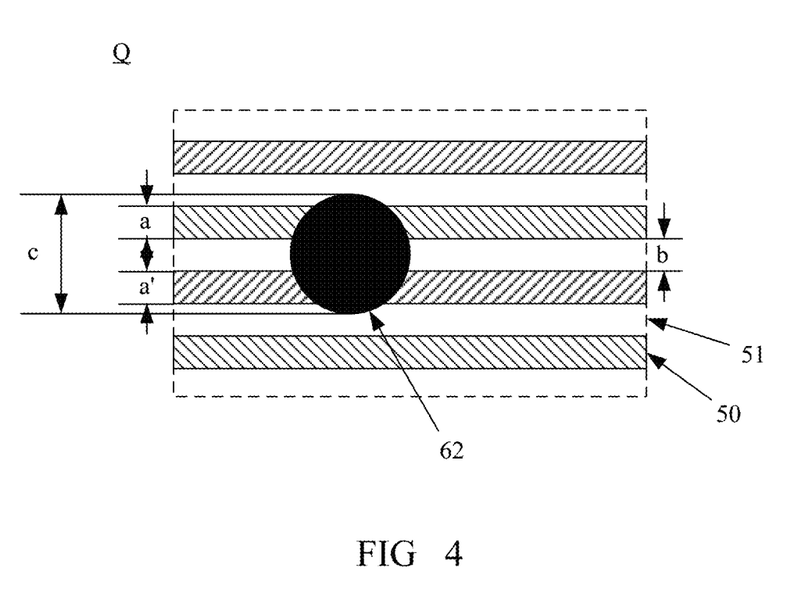
FIG. 4 is an enlarged view illustrating a construction of a single-stroke line portion involved in the second embodiment of the present disclosure.

FIG. 4 is an enlarged view illustrating a construction of a single-stroke line portion involved in another embodiment of the present disclosure, and corresponding to the area Q shown in FIGS. 1 and 2.

The single-stroke line portion 20 is formed by bending one line 50 into a zigzag shape. As shown in FIG. 4, for example, under the situation that the widths of two adjacent lines 50 of the single-stroke line portion 20 are respectively set to a and a', the gap 51 between the two lines 50 is set to b, and the diameter of the needle 62 is set to c, in order to reliably disconnect the lines 50 of the single-stroke line portion 20 when the needle 62 is inserted, the sum of the widths a and a' of the two lines 50 and the gap b between the two lines 50 must be less than or equal to the diameter c of the needle 62. That is, $a+a'+b \leq c$ shall be met. As a specific example of the above structure, the sum of the widths (a+a') of the two lines 50 and the gap b between the two lines 50, a+a'+b, is set to be a value within 0.225 mm to 3 mm. In addition, the widths of the two lines 50, that is, a and a', can be equal, and can be not equal.

According to the structure of the present embodiment, even if the insertion position of a needle with a smaller diameter slightly deviates, still it can reliably cause the line 50 to disconnect, so as to more reliably prevent the occurrence of illegal replacement of the contents with a finer needle.

In the following description, modifications of the present disclosure will be explained with reference to FIGS. 5 and 6.

Varied Embodiment

As an example of the circuit pattern of a single-stroke line portion formed by winding shaped lines, the first embodiment described above enumerates a circuit pattern formed by bending one line into a zigzag shape, but it is not limited to this. For example, the circuit patterns shown in FIGS. 5 and 6 can also be used.

Figure 5:
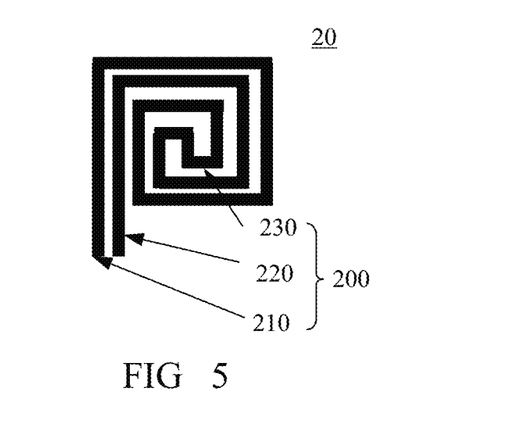
FIG. 5 is a schematic diagram showing an example of a circuit pattern of the single-stroke line portion involved in a modification of the present disclosure.

FIG. 5 is a schematic diagram showing an example of a circuit pattern of the single-stroke line portion involved in a modification of the present disclosure. As shown in FIG. 5, the two winding lines 210 and 220 are winded in parallel in the same direction, and ends of them at one side of the winding axis are connected with a connection line 230 so as to form the circuit pattern 200.

Figure 6:
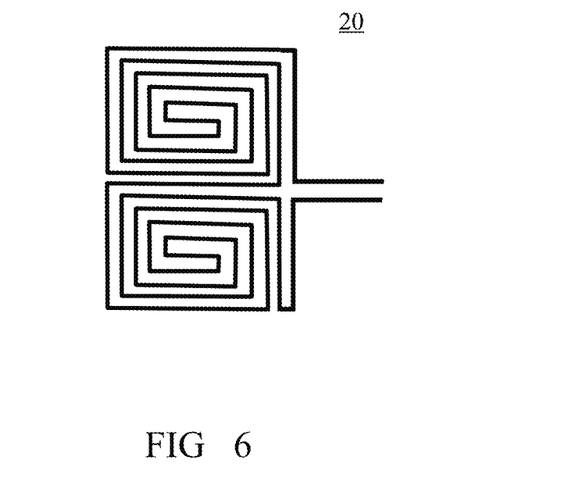
FIG. 6 is a schematic diagram showing another example of a circuit pattern of the single-stroke line portion involved in a modification of the present disclosure.

In addition, as another example of the circuit pattern of the single-stroke line portion 20, as shown in FIG. 6, two circuit patterns having identical shapes as that shown in FIG. 5 are connected to form the circuit pattern.

Figure 7:
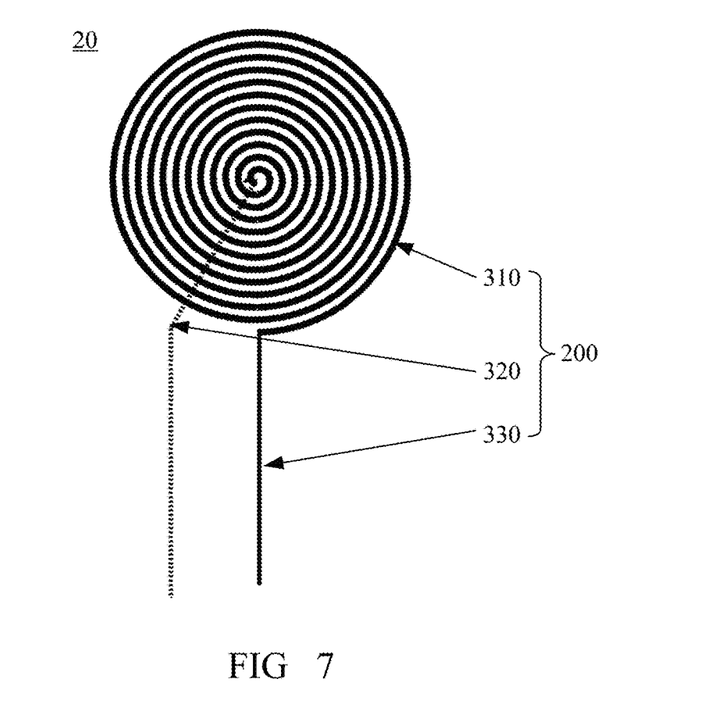
FIG. 7 is a schematic diagram showing a further example of a circuit pattern of the single-stroke line portion involved in a modification of the present disclosure.
Figure 8:
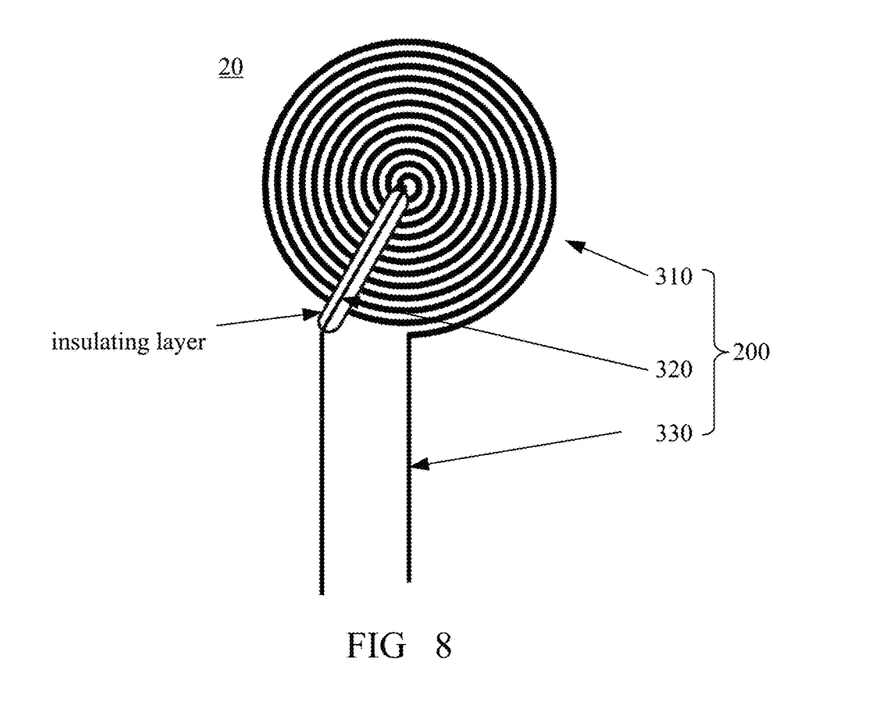
FIG. 8 is a schematic diagram showing a still further example of a circuit pattern of the single-stroke line portion involved in a modification of the present disclosure.

Besides, in addition to the winding lines, the spiral lines shown in FIGS. 7 and 8 can also be used to form a single-stroke line portion 20.

FIG. 7 is a schematic diagram showing a further example of a circuit pattern 200 of the single-stroke line portion 20 involved in a modification of the present disclosure. As shown in FIG. 7, the circuit pattern 200 is formed by one winding line. The circuit pattern 200 comprises a spiral portion 310, an inner circumference lead 320 drawn from the inner circumference end portion of the spiral portion 310, and an outer circumference lead 330 drawn from the outer circumference end portion of the spiral portion 310.

In the situation where the circuit pattern 200 is formed on a double-sided single-layer substrate, for example, the inner circumference lead 320 is disposed on the back side of the substrate, and the outer circumference lead 330 and the spiral portion 310 are disposed on a surface of the substrate. In other words, the single-stroke line portion 20 is formed by the following circuit pattern 200: one winding line is twisted into a spiral shape across the surface and the back of the double-sided single layer substrate.

In addition, in the situation where the circuit pattern 200 is formed on a multilayer substrate, for example, the inner circumference lead 320 is disposed on one layer of the substrate, and the outer circumference lead 330 and the spiral portion 310 are disposed on another layer of the substrate. In addition, the outer circumference lead 330 and the spiral portion 310 can be further disposed on different layers of the substrate. In other words, the single-stroke line portion 20 is formed by the following circuit pattern 200: one winding line is twisted into a spiral shape across the different layers of the multilayer substrate.

In addition, as a further example of the circuit pattern of the single-stroke line portion 20 involved in a modification, as shown in FIG. 8, in the situation where the circuit pattern 200 is formed on a single-side single-layer substrate, it is only required to dispose an insulating layer between the inner circumference lead 320 and the spiral portion 310.

In addition, for the circuit patterns of these modifications, it is preferred to set the sum of the widths of the two adjacent lines and the distance between the two lines to be a value between 0.225 mm to 3 mm.

Further, while a wine bottle with a cork is illustrated as an example of the container of the present disclosure in the above descriptions, it is not limited to this. The present disclosure may also be applied to beverage bottles, liquid seasoning bottles, etc.

The embodiments and modifications of the present disclosure are illustrated above. However, various omissions, replacements, and modifications may be made within the scope of the idea of the present disclosure.

REFERENCE NUMERALS

10 Radiation element; 11 Slit (or loop circuit) for impedance matching adjustment; 12 IC chip; 13 Disconnection detection circuit; 14 Substrate; 15 Loop circuit for antenna; 20 Single-stroke line portion; 41 Tag paper; 50 Lines; 51 Gap; 62 Needle; 100, 100' IC tag insert; 200 Circuit pattern; 210, 220 Winding lines; 230 Connection line; 310 Spiral portion; 320 Inner circumference lead; 330 Outer circumference lead; 400, 400' sticker with IC tag; 600 Covered container; 610 Cover portion; 620 Container body

What is claimed is:

1. A sticker comprising an integrated circuit (IC) tag having an ultrahigh frequency (UHF) or high frequency (HF) integrated circuit (IC), wherein the UHF or HF integrated circuit of the tag consists of:
   an antenna portion;
   an IC chip coupled to the antenna portion and communicating through the antenna portion, and
   a disconnection detection circuit consists of a) a first portion, which is a single-stroke line portion, and b) a second portion between the single-stroke line portion and the antenna portion, the second portion couples the single-stroke line portion to the IC chip;
   wherein the sticker is installed on a bottle, which is covered with a cover, so that a first edge of the sticker is on an upper surface of the cover of the bottle and a second edge of the sticker, which is opposite to the first edge, is on a side surface of the bottle,
   wherein the single-stroke line portion of the disconnection detection circuit is adhered to the upper surface of the cover of the bottle,
   the antenna portion, the IC chip and at least a part of the second portion of the disconnection detection circuit are adhered to the side surface of the bottle;

the IC chip detects disconnection based on resistance of the single-stroke line portion when the upper surface of the cover is penetrated with a needle and communicates the detected disconnection to a reader through the antenna portion; and the single-stroke line portion comprises winding, spiral or zigzag lines, such that a sum of widths of any two adjacent lines of the single-stroke line portion is from 0.225 millimeters (mm) to 3 mm and a gap between any two adjacent lines of the single-single stroke line portion is from 0.225 mm to 3 mm.

2. The sticker of claim 1, wherein the single-stroke line portion comprises the winding lines.

3. The sticker of claim 2, wherein the single-stroke line portion covers the whole upper surface of the cover.

4. The sticker of claim 2, further comprising an opaque tag paper over the single-stroke line portion on the upper portion of the cover, wherein the opaque tag paper obscures the single-stroke line portion.

5. The sticker of claim 1, wherein the single-stroke line portion comprises the spiral lines.

6. The sticker of claim 5, wherein the single-stroke line portion covers the whole upper surface of the cover.

7. The sticker of claim 5, further comprising an opaque tag paper over the single-stroke line portion on the upper portion of the cover, wherein the opaque tag paper obscures the single-stroke line portion.

8. The sticker of claim 1, wherein the single-stroke line portion comprises the zigzag line.

9. The sticker of claim 1, wherein the single-stroke line portion comprises twisting two winding lines in parallel in the same direction and connecting ends of said two winding lines at one side of winding axis with a connection line.

10. The sticker of claim 1, wherein the single-stroke line portion comprises twisting two winding lines in parallel in the same direction around a winding axis and connecting ends of the two winding lines at one side of the winding axis with a connection line.

11. The sticker of claim 1, wherein the single-stroke line portion covers at least a part of the upper surface of the cover is covered, said part of the upper surface corresponds to an outer side of the opening of the covered bottle.

12. The sticker of claim 11, wherein the single-stroke line portion covers the whole upper surface of the cover.

13. The sticker of claim 11, further comprising an opaque tag paper over the single-stroke line portion on the upper portion of the cover, wherein the opaque tag paper obscures the single-stroke line portion.

14. The sticker of claim 1, further comprising an opaque tag paper over the single-stroke line portion on the upper portion of the cover, wherein the opaque tag paper obscures the single-stroke line portion.

15. The sticker of claim 1 having a rectangular sheet shape.

16. The sticker of claim 15, further comprising a substrate having a rectangular sheet shape, wherein the antenna portion, the IC chip and the disconnection detection circuit are disposed on the substrate.

17. The sticker of claim 1, wherein the bottle is a wine bottle.

* * * * *